United States Patent [19]

Reece

[11] Patent Number: 4,936,246
[45] Date of Patent: Jun. 26, 1990

[54] APPARATUS FOR SEPARATING DOUGH BALLS

[76] Inventor: Vernon E. Reece, 1936 W. 47th Pl., Tulsa, Okla. 74125

[21] Appl. No.: 398,089

[22] Filed: Aug. 24, 1989

Related U.S. Application Data

[63] Continuation-in-part of Ser. No. 226,223, Jun. 29, 1988, Pat. No. 4,862,824.

[51] Int. Cl.⁵ .......................... B05C 1/02; B05C 3/05; B05C 3/09
[52] U.S. Cl. ........................................ 118/22; 118/23; 118/26
[58] Field of Search ........................ 118/13, 19, 22, 26, 118/29, 31, 61

[56] References Cited

U.S. PATENT DOCUMENTS

| | | | |
|---|---|---|---|
| 2,616,391 | 11/1952 | Russell | 118/19 |
| 2,770,212 | 11/1956 | Marantz | 118/610 |
| 3,129,167 | 4/1964 | Frangos | 118/23 |
| 3,520,277 | 7/1970 | Gordon | 118/23 |
| 3,910,227 | 10/1975 | Reece | 118/31 |
| 4,182,260 | 1/1980 | Reece | 118/26 |
| 4,550,677 | 11/1985 | Reese et al. | 118/31 |

Primary Examiner—Willard Hoag
Attorney, Agent, or Firm—Head & Johnson

[57] ABSTRACT

An apparatus for separating dough balls from reusable breading having a container for holding breading containing dough balls, the container having an aperture in the bottom thereof for selectably discharging the breading having dough balls commingled therewith, a sifter having foraminous portions positioned below the container bottom aperture and having a bottom with a central opening through the foraminous portions, a plurality of concentric circular walls having openings therethrough arranged to cause dough balls to be separately discharged through the sifter central opening, a divider below the sifter central opening separating into divergent downwardly inclined paths the breading sifted from the sifter, the divider having an opening therethrough, a conduit received within the divider opening having an upper end in close communication with the sifter central opening, first and second paralleled and spaced apart breading collector pans below the sifter and divider to receive breading discharged from the sifter, and a dough ball collector pan below the conduit and between the breading collector pans for collecting dough balls discharged from the filter.

6 Claims, 10 Drawing Sheets

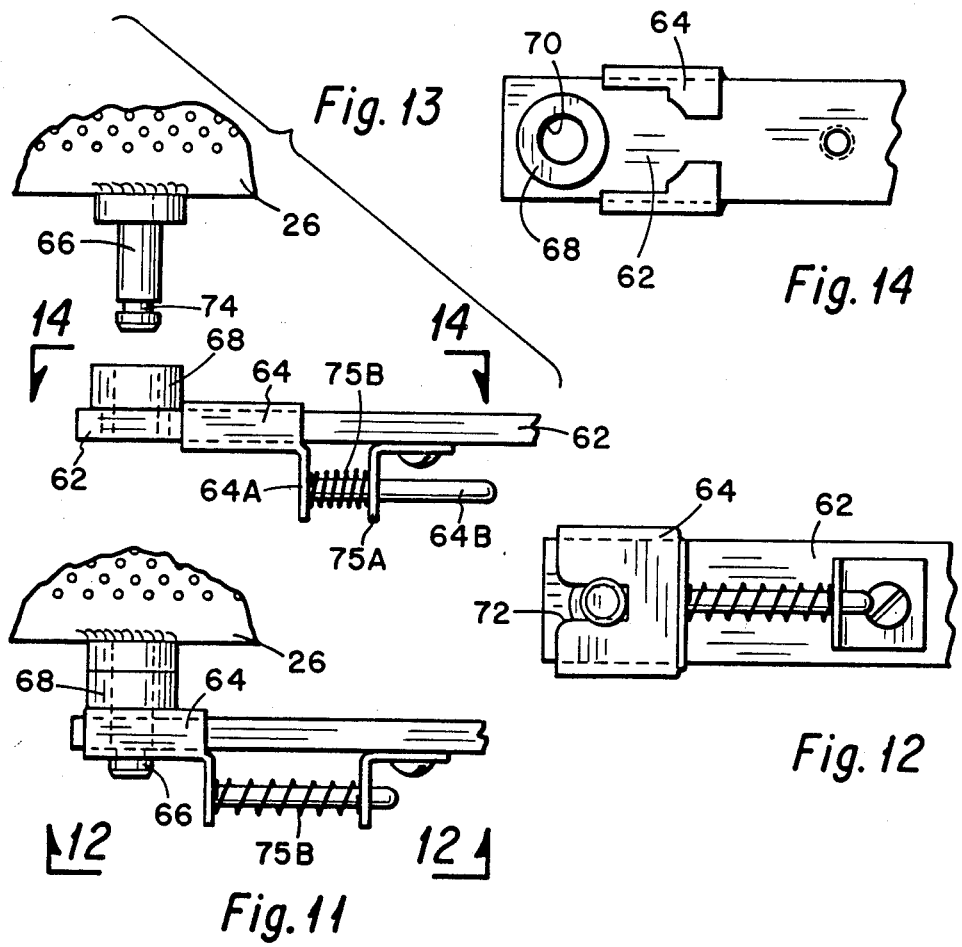
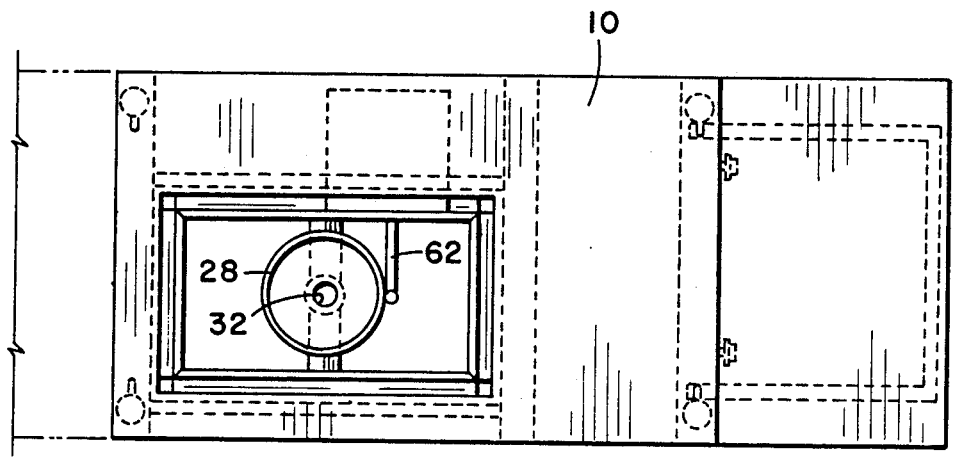

APPARATUS FOR SEPARATING DOUGH BALLS

CROSS-REFERENCE

This is a continuation-in-part of application Ser. No. 226,223, filed June 29, 1988 entitled, "Improved Sifter For Breading Apparatus", now U.S. Pat. No. 4,862,824.

SUMMARY OF THE DISCLOSURE

In the food industry it is a practice to prepare certain foods by dipping pieces of the food in a batter and then forming a breading on the food by subjecting the batter covered food to a breading mixture. This method of food preparation is most frequently employed in the frying of pieces of chicken. The pieces of chicken are first dipped in a liquid batter and then placed in breading which is primarily flour with spices and seasoning mixed with it. The pieces of chicken are tumbled manually within the breading so that the breading adheres to the batter forming a coating on the pieces of chicken. The pieces of chicken may then be fried such as in a pan of hot liquid grease.

In the process of breading the batter-dipped pieces of chicken, a certain amount of the liquid batter separates from the pieces of chicken and formulates dough balls in the breading mixture. These dough balls tend to grow in size as the mixture is being used. The dough balls constitute a non-usable by-product of the process of breading pieces of chicken. Any breading remaining in the container after the breading process is completed can be reused; however, before the breading can be used the dough balls must be separated from it.

For this reason sifters have been developed for sifting the breading to remove the dough balls. For reference to prior issued patents which provide sifters for use in breading operations, reference may be had to U.S. Pat. Nos. 3,910,227; 4,182,260 and 4,550,677. These three prior issued United States Patents are incorporated herein by reference.

Each of these prior issued patents demonstrate improvements in apparatus for breading pieces of chicken. U.S. Pat. Nos. 3,910,277 and 4,182,260 are directed toward improved sifters wherein the dough balls remain in the sifters and must be removed from the sifters by lifting the sifter mechanism out of the breading machine and dumping the dough balls. U.S. Pat. No. 4,550,677 shows a means of sifting wherein the dough balls are separated from the breading and separately discharged. In this last-mentioned patent, the dough balls travel down a chute extending at an angle relative to the sifter. A substantial structure for conducting the sifted breading to a container below the sifter is required since it must provide means for passage of the angularly-shaped dough ball conduit out the sidewalls of the structure. This system is inconvenient to use and requires an increased number of parts which must be washed and sanitized.

Copending patent application Nos. 226,023 and 339,382 are directed toward an improvement in the breaders and sifters as shown in these previously issued United States Patents. In this breading apparatus, a breading container is provided for holding breading which, in the process of breading, will accumulate dough balls therein. The breading container has an opening in the bottom for selectably discharging breading having dough balls commingled. In the typical operation, after the breading procedure has been completed and a sufficient amount of dough balls have accumulated in the breading, the operator uncovers the aperture in the bottom and allows the breading and dough ball mixture therein to pass through the aperture downwardly through the opening.

Below the opening is a sifter having foraminous cylindrical sidewalls and a foraminous bottom. The sifter is positioned directly below the aperture in the breading container so that breading having dough balls commingled therethrough pass directly into the sifter. The sifter has a labyrinth path arrangement in the bottom which communicates with a central bottom opening. As the sifter is actuated by sequential oscillation back and forth around a vertical axis, the breading is caused to pass through the walls and through the bottom of the sifter whereas the dough balls pass through the labyrinth path and through the bottom central opening. The dough balls are discharged into a separated dough ball collector which is positioned directly below the sifter central opening.

In one embodiment the dough ball collector is positioned within the breading collector, both of which are positioned directly below the sifter. In a second embodiment, the breading collector has a bottom with an opening therein and an upright tubular conduit communicating with the opening. The tubular conduit is in alignment with the sifter central opening so that dough balls passing through the sifter central opening pass downwardly through the upright tubular conduit. The dough ball collector is positioned below the breading collector and directly below the upright tubular conduit to collect the dough balls passing through it.

In the embodiment of the invention of this disclosure, a divider is positioned below the sifter which separates into divergent downwardly inclined paths the breading sifted from the sifter. In the preferred arrangement, the divider is elongated and, in cross-section, of an inverted V-shaped configuration. The divider has an opening through it, preferably centrally spaced between the two opposed ends.

A vertical conduit is positioned in the opening in the divider. The upper end of the conduit is in close communication with the sifter central opening.

Below the divider is placed first and second parallel and spaced apart breading collector pans. The breading collector pans are positioned to receive breading discharged from the sifter as diverted, in part, by the divider.

Positioned between the breading collector pans is a dough ball collector pan which is immediately below the lower end of the conduit. Dough balls passing from the sifter pass through the conduit and into the dough ball collector pan.

Thus, three collector pans are employed, two breading collector pans, and between them, a dough ball collector pan.

A better understanding of the invention will be had with reference to the following description and claims, taken in conjunction with the attached drawings.

DESCRIPTION OF THE DRAWINGS

FIG. 8 is a top plan view, in reduced scale, of the improved apparatus of FIG. 7.

FIG. 11 is a partial elevational view of the mechanism by which the shaker linkage is attached to the sifter as taken along the line 11—11 of FIG. 7.

FIG. 12 is an underneath view of the mechanism for attachment of the linkage arm to the sifter basket as taken along the line 12—12 of FIG. 11.

FIG. 13 is an exploded view showing the linkage as separated from the sifter basket.

FIG. 14 is a fragmentary plan view of the linkage arm after separation from the sifter basket.

DESCRIPTION OF THE PREFERRED EMBODIMENT

Figure 1:
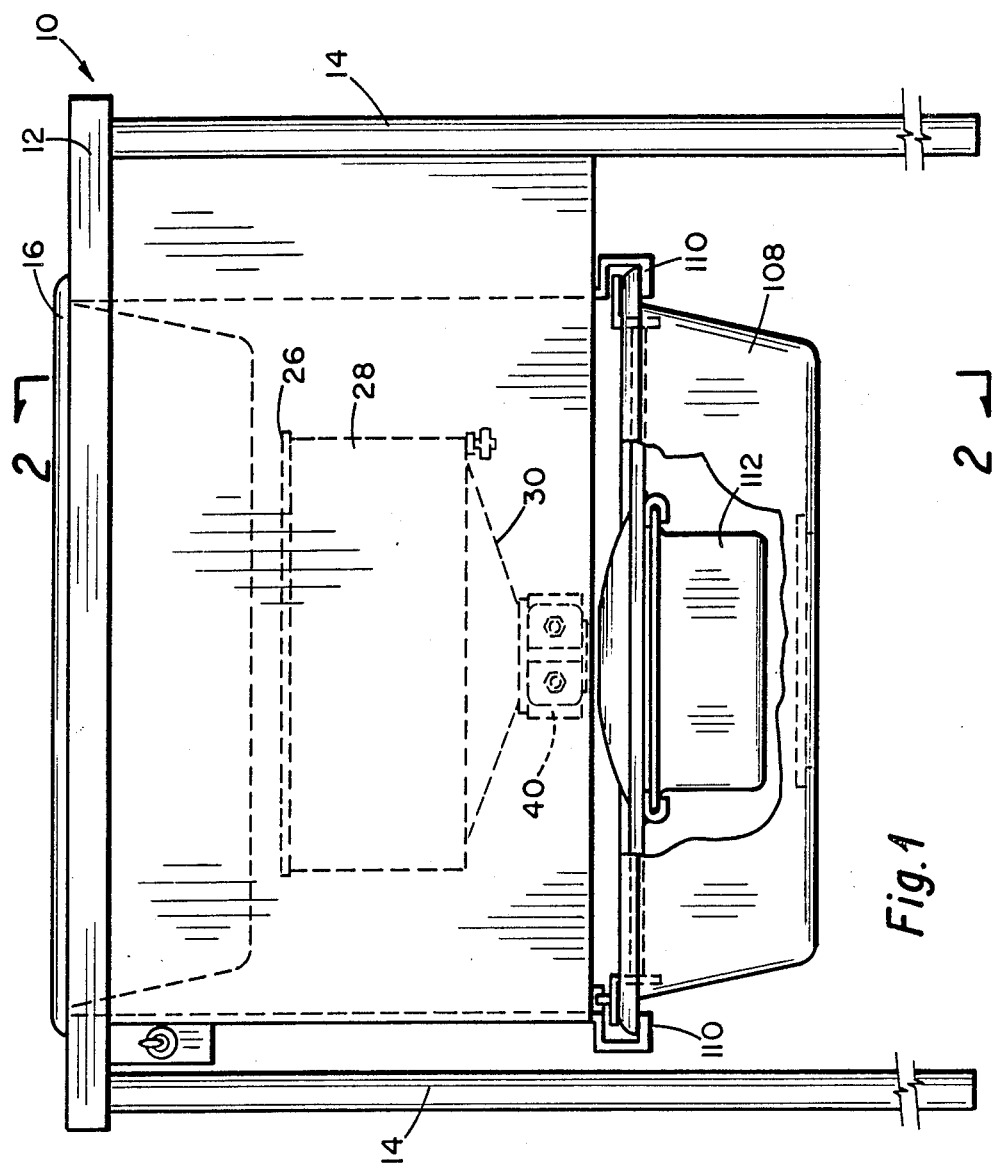
FIG. 1 is an elevational view of an apparatus which employs the principles of this disclosure, shown partially cut away in the lower portion and some of the internal portions being shown in dotted outline.
Figure 2:
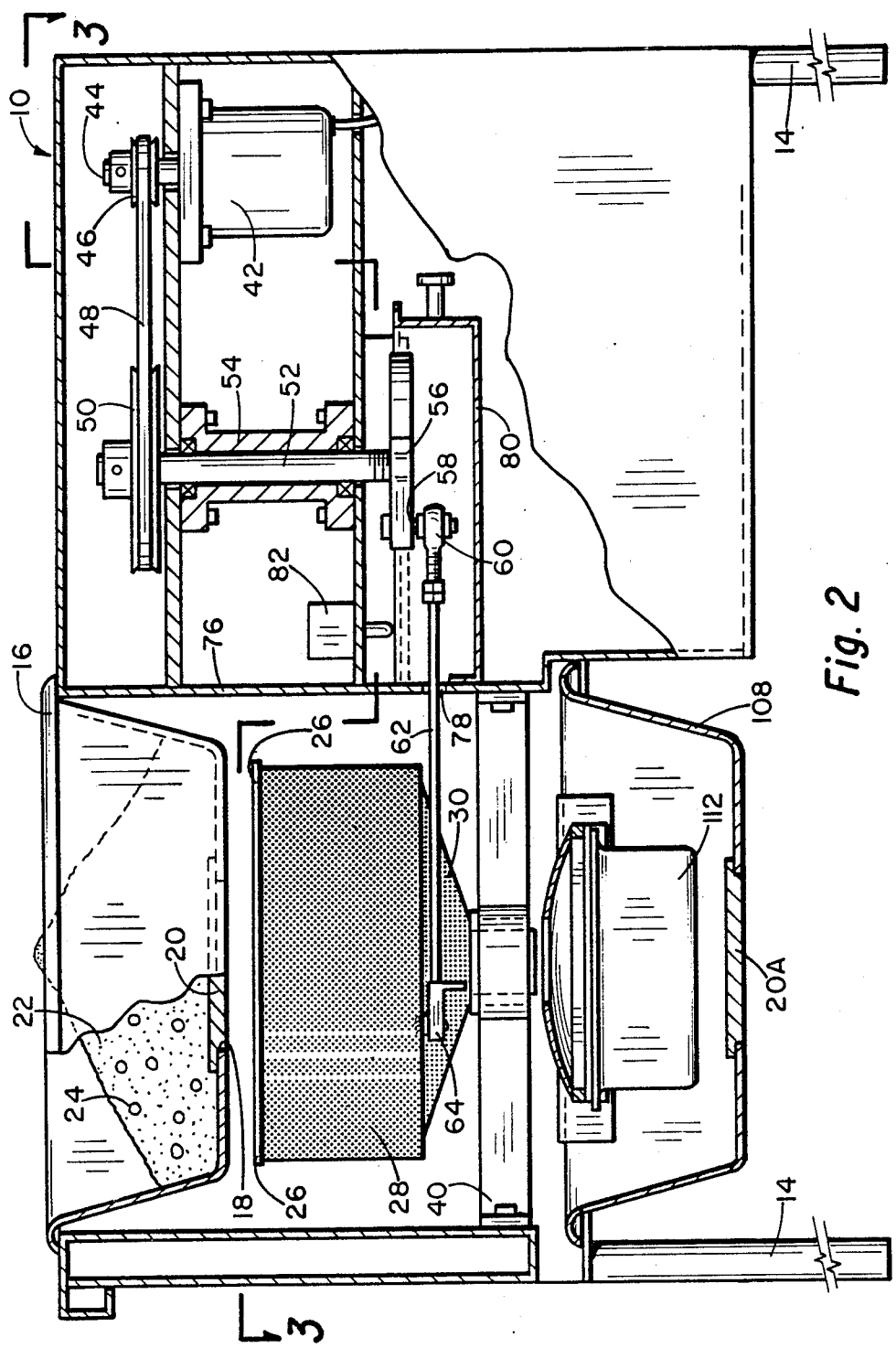
FIG. 2 is an elevational cross-sectional view taken along the line of 2—2 of FIG. 1, showing internal mechanisms of the breading apparatus.
Figure 3:
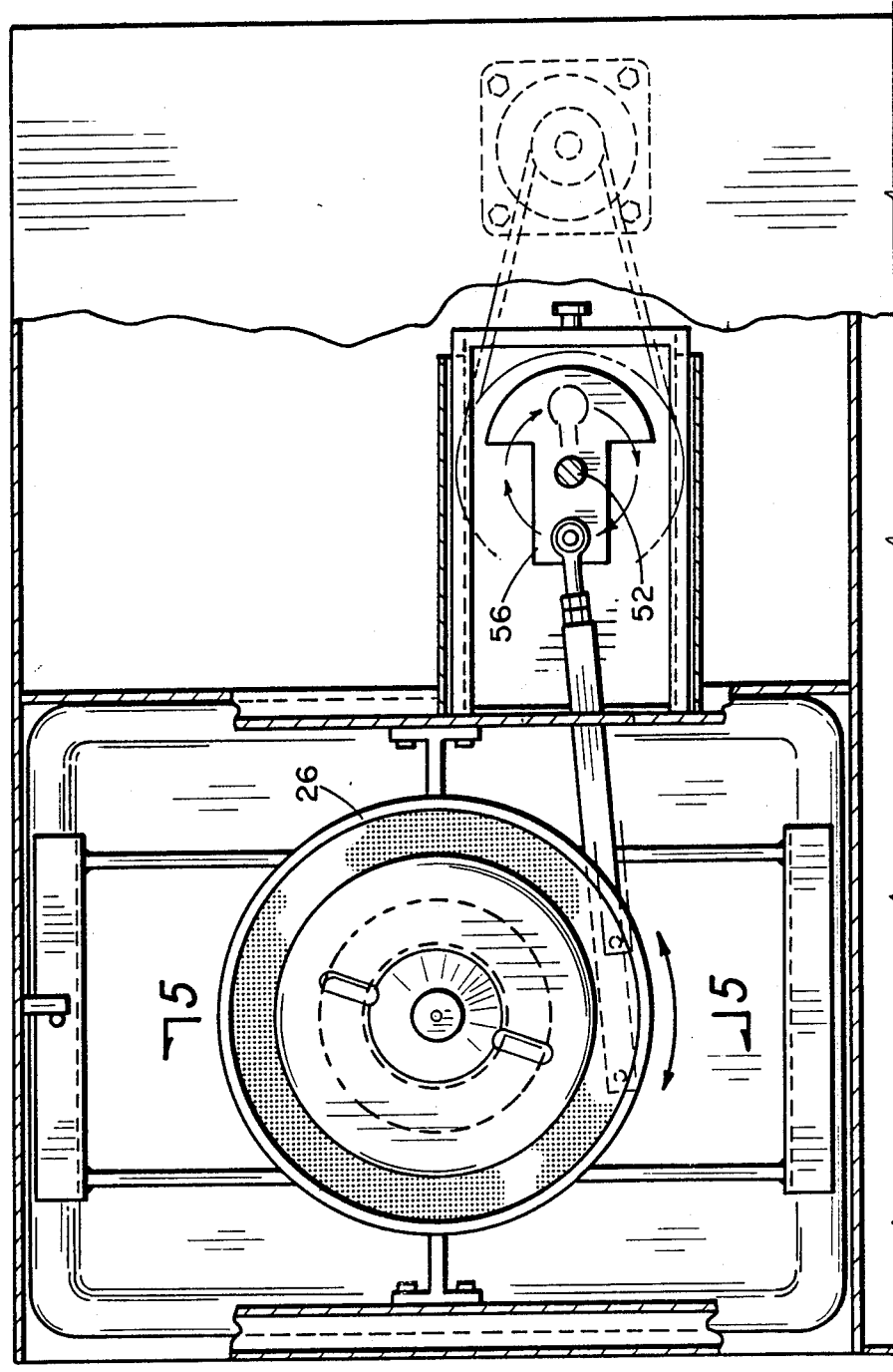
FIG. 3 is a horizontal cross-sectional view taken in three different planes along the line 3—3 of FIG. 2, showing a downwardly looking view of mechanisms making up the improved breading apparatus.

Referring to the drawings, and first to FIGS. 1, 2, and 3, the elements making up the breader of this invention are shown in a first embodiment. The breader is indicated generally by the numeral 10 and includes a table 12 with legs 14 supporting it. The table has an opening therein receiving a first container 16 which is also referred to as a breading container. The breading container 16 as shown in FIG. 2, has an opening 18 therein in the bottom having a removable closure. Shown in the breading container is breading material 22 which is primarily made up of flour with spices and seasonings. During the process of breading batter covered pieces of chicken (not shown), dough balls 24 are formed in the breading. The purpose of this breader device is first to provide a convenient location for the breading operation—that is, for the support of breading container 16; and second, after dough balls are formed in the breading, to provide a means of separating the remaining dough balls so that the breading material may be reused.

Figure 5:
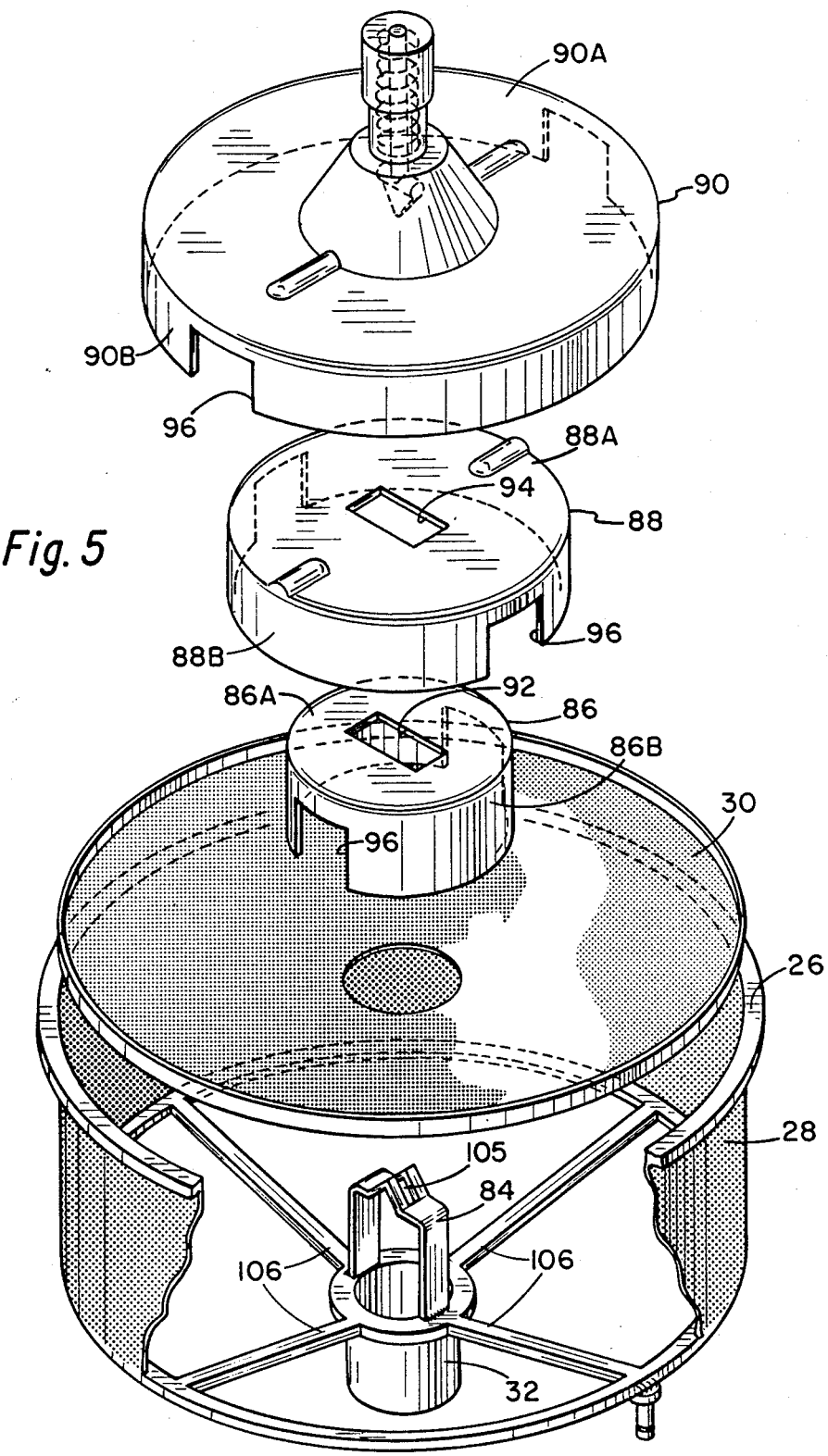
FIG. 5 is an exploded isometric view of the sifter mechanism as shown in FIG. 4.

Positioned below the breading container 16 is a sifter 26. The sifter has a cylindrical foraminous sidewall 28 and a foraminous tapered bottom 30. As shown in FIG. 5, the sifter includes a tubular portion 32 communicating with a central opening 34 in the bottom of the sifter. The tubular portion 32 forms a pivotal member around which the sifter is oscillated. A plastic sleeve 36 surrounds the tubular portion 32 and in turn is supported by a collar 38 which is held to the table by structural members 40, as shown in FIG. 2. The plastic sleeve serves as a bearing.

To separate the dough balls 24 from the breading 22, the closure 20 is removed allowing the breading and commingled dough balls to pass downwardly into the sifter 26. In FIG. 2, the method of oscillating the sifter is best illustrated. A motor 42 drives a shaft 44 having a sheave 46 thereon which, by means of belt 48, rotates a second sheave 50 attached to spindle 52. The spindle 52 is rotatably supported by a bearing block 54. At the other end of spindle 52 a crank arm 56 is affixed. The crank arm includes a counterweight portion as best seen in FIG. 3.

Extending from the crank arm is a pin 58. Received on the pin is a bearing 60 and a connecting rod 62. The other end of the connecting rod has a coupling member 64 which removably attaches to a pin 66 extending from the lower outer portion of the sifter basket 26.

It can be seen that when motor 42 is energized the rotation of crank arm 56 oscillates connecting rod 52 and thereby reciprocally oscillates sifter basket 26 about a vertical axis which passes centrally through the basket tubular portion 34.

FIGS. 11 through 14 show the details of the preferred embodiment for attaching the connecting rod 62 to pin 66 extending from the sifter basket 26. Affixed to the outer end of the connecting rod is a collar 68 having an opening 70 therein. Pin 66 is received in the opening 70. Slideably received upon the connecting rod is the coupling member 64. As shown in FIG. 12, the coupling member has a slot 72 which engages pin 66. The pin is provided with a reduced diameter circumferential groove 74 as shown in FIG. 13 which receives the opening 72 in the coupling member. When the coupling member is slid in a direction away from pin 66, the pin may be removed from engagement with the connecting rod 62. Since the sifter tubular portion 32 is slideably received within the plastic bearing 36, by moving the coupling member 64 the entire basket 26 may be easily removed for cleaning.

The coupling member 64 has a downwardly bent portion 64A which extends generally perpendicular to the connecting rod 62. Extending from the bent portion 64A is a small diameter shaft 64B. Attached to the connecting rod 62 is a basket 75A having an opening therethrough which slideably receives the small diameter shaft 64B. A spring 75B is received on the small diameter shaft 64B between the bracket 75A and the flange portion 64A. Spring 75B thereby keeps the coupling member 74 blocked upon the pin 66 so that it can not become inadvertently detached, but the coupling member 64 may be manually slid on the connecting rod 62, compressing spring 64B to release the connecting rod from sifter pin 66.

Referring again to FIG. 2, it can be seen that the underneath of table 10 is divided basically into two portions. The first portion includes the breading container 16 and the sifter 26, and is separated from the other portion by a wall 76. Since breading passes downwardly within the interior of the table containing the sifter portion, the function of wall 76 is to separate the oscillation mechanism from the area containing breading. In order to permit transfer of reciprocal energy to the sifter, a small slot 78 is provided in wall 76 through which the connecting rod 62 passes. Some breading will inevitably migrate through this small slot. For this purpose, a tray 80 is slideably positioned directly below the crank arm 56 and in communication with the opening 78. The tray serves to collect any breading which might migrate through the opening 78. To ensure that the tray 80 is in position before motor 42 may be energized, a microswitch 82 is positioned so that if is actuated when the tray is in position and non-actuated when the tray is out of position.

Figure 4:
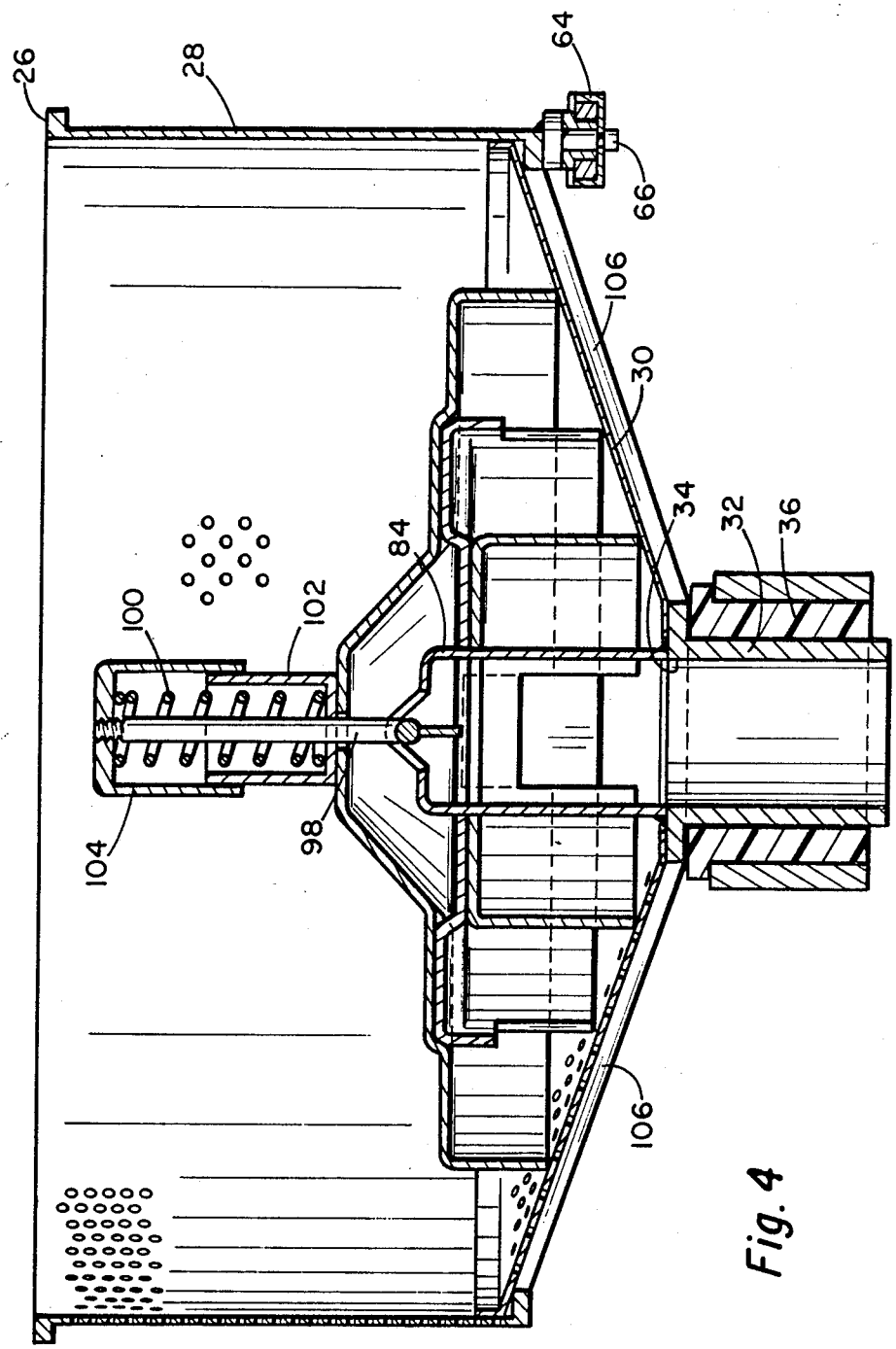
FIG. 4 is an enlarged scale, elevational cross-sectional view of one embodiment of the sifter mechanism which includes means for causing the breading to be discharged through the sidewalls and bottom of the sifter and in which the dough balls intermixed with the breading are separated and passed through a bottom central opening.

Referring to FIGS. 4 and 5, the mechanism for separating the dough balls from the breading is shown. Extending upwardly from the sifter basket tubular portion 72 is a bracket 84. Received on the bracket are three inverted, concentric cup-shaped members 86, 88 and 90. The members vary in diameters with the smallest on the bottom and the largest on the top. Members 86 and 88 have openings 92 and 94, respectively, which receives bracket 84.

Each of the inverted cup-shaped members 86, 88 and 90 includes a top and a downwardly extending cylindrical wall portion. Specifically, first cup-shaped member 86 has a top 86A and downwardly extending cylindrical wall 86B. In like manner, intermediate cup-shaped member 88 has a top 88A and cylindrical wall 88B; and member 90 has a top 90A and a cylindrical wall 90B. Each of the walls 86B, 88B and 90B has at least one notched opening 96 therein. The inverted cup-shaped members are arranged so that the openings 96 are not in alignment, but are offset from each other thereby creating a labyrinth path through which dough balls must travel to reach central openings 34.

Affixed to the top 90A of the uppermost inverted cup-shaped member is a downwardly extending hook 98 which is retained in an upwardly biased position by a spring 100. Encompassing the spring are telescoping members 102 and 104 with member 104 being attached to the upward end of hook 98. When the upper telescoping member 104 is pressed downwardly against the resistance of spring 100, the hook 98 may be rotated to disengage it from a slight opening 105 in the top of bracket 84. In this manner, the inverted cup-shaped members 86, 88 and 90 may be secured to or removed from within the interior of sifter basket 24.

As shown in FIG. 5, the sifter basket bottom 30 is preferably removable from the basket sidewall portion 28, and, to support the tubular portion 32 to the sidewall portion 28 and legs 106, are employed.

Referring again to FIGS. 1 and 2, positioned directly below the sifter 26 is a second container or breading receptor 108. The breading receptor 108 may be identical in size to the breading container 16, and it has an opening in the bottom with a cover 20A. As breading passes downwardly through the foraminous portions of sifter 26, it passes into the breading receptor 108. After all of the breading has been discharged from the breading container 16 and has passed through the sifter 26, the breading receptor 108 may be removed and exchanged in position with the breading container 16.

The breading receptor 108 may be supported in position by a variety of means. In the illustrated arrangement, channels 110 receive the outer edges of the container and support it in position below the sifter.

To receive the dough balls which are separately discharged from the sifter, a third container or dough ball collector 112 is employed. The dough ball collector 112 is of smaller dimensions than the breading collector 108 and is removably supported within the breading collector as best shown in FIG. 4. A bracket member 114 extends across the breading collector 104 to engage the upper lips thereof by means of angle members 116. Affixed to stretchers 118 extending between the angle members 116 are channels 120 which slideably receive the upper edge 112A of dough ball collector 112.

After the breading collector 108 has been removed and before it is interchanged with breading container 16, the bracket 114 is removed and placed in the pan which is to be positioned beneath the sifter. Dough balls within dough ball collector 112 are first discarded.

Figure 6:
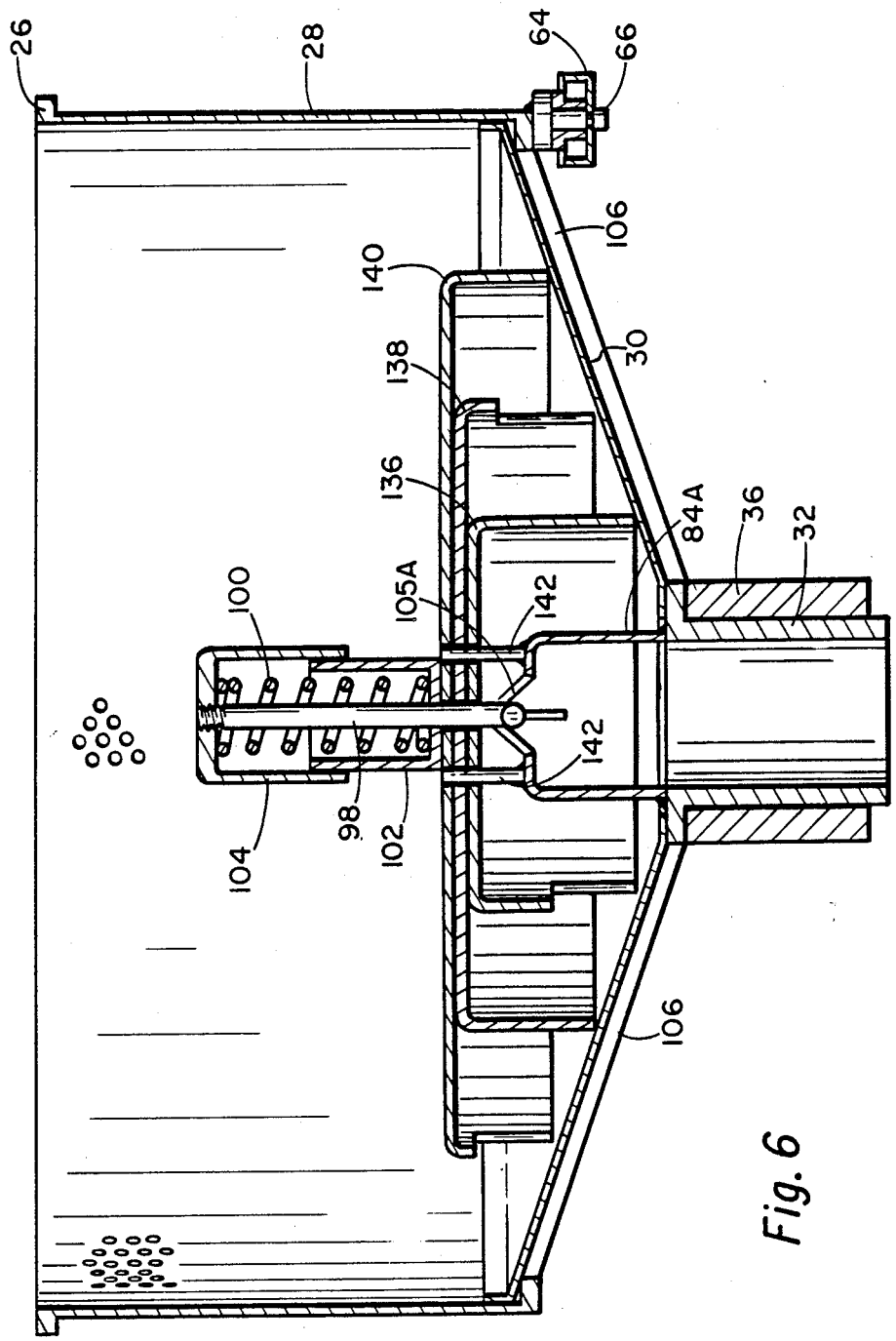
FIG. 6 is an enlarged scale, cross-sectional view of the sifter basket showing alternate embodiment of the dough ball selector mechanism.

FIG. 6 shows an alternate embodiment of the dough ball separator within sifter 26. In the arrangement of FIG. 6, bracket 874A is slightly shorter, and three inverted cup-shaped members 136, 138 and 140 are all provided with flat tops and with downwardly extending cylindrical walls. Affixed to bracket 84A are pins 142 which extend upwardly through openings formed in the inverted cup-shaped member flat top portions. This keeps the inverted cup-shaped members in alignment so that the notch openings 144 are properly oriented. Further, it can be seen that the pins 142 may be used to limit the downward position of the inverted cup-shaped members so that the lower edges of the cylindrical portions thereof do not engage sifter bottom 30. In the arrangement of FIG. 6 the inverted cup-shaped members 136, 138 and 140 may be separately formed as illustrated, or they can be integrally formed as one element.

Figure 7:
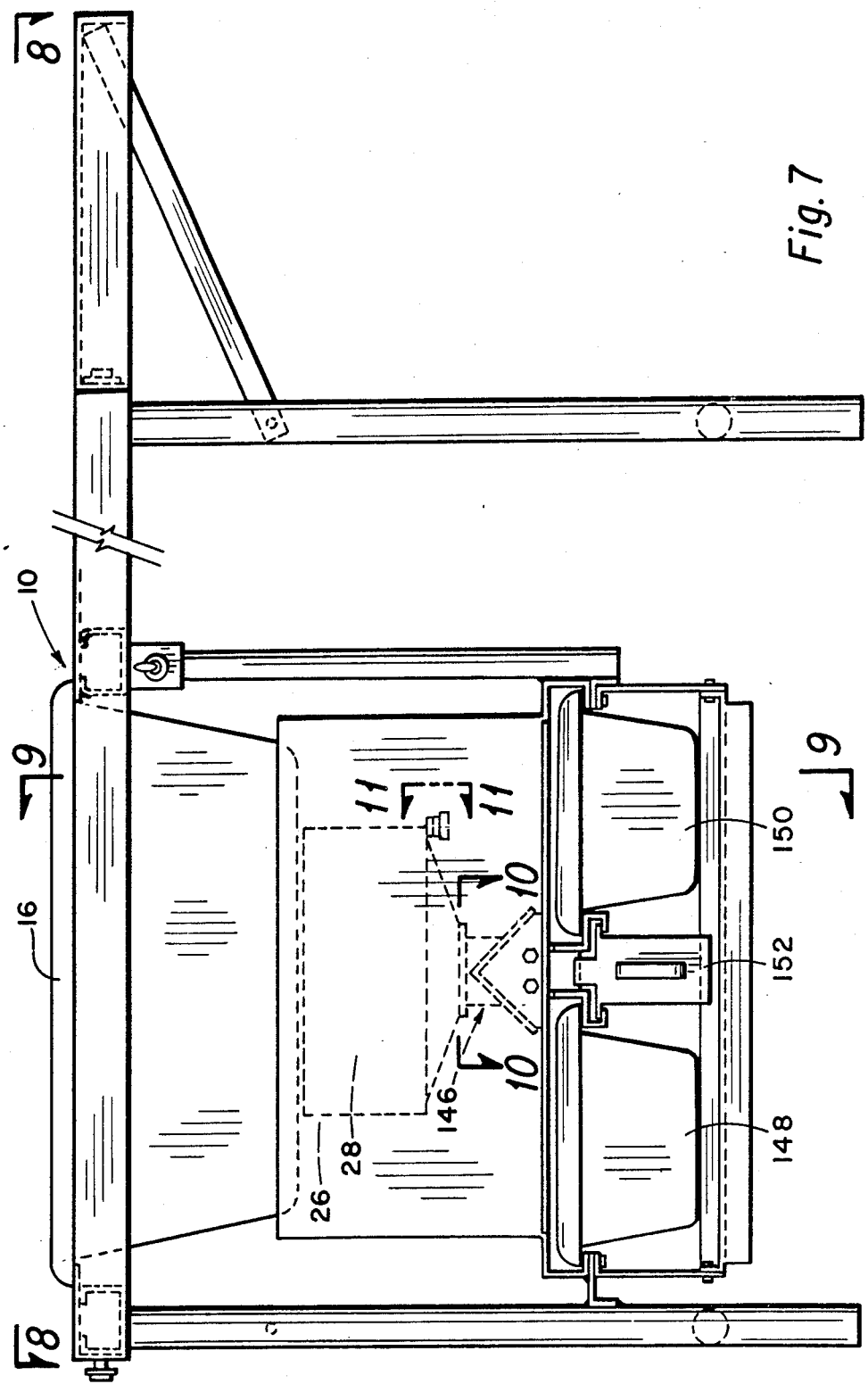
FIG. 7 is an elevational view, shown partially in dotted outline, of an alternate and improved embodiment of the breading apparatus of this disclosure.
Figure 9:
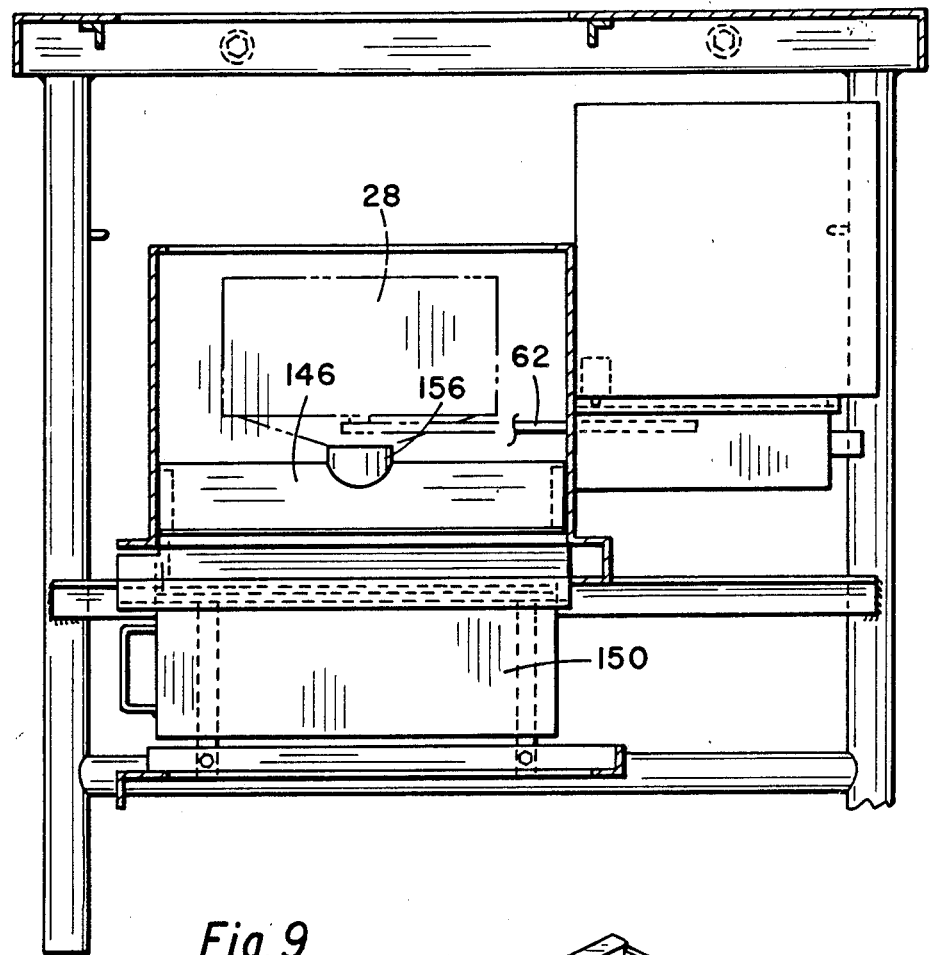
FIG. 9 is an elevational cross-sectional view of the improved apparatus taken along the line 9—9 of FIG. 7.

FIGS. 7-18 show an alternate embodiment of the invention. In this alternate embodiment, a breader 10 includes the first container wherein the breading is placed, and wherein pieces of food are breaded. Below the breader is a sifter 26 having cylindrical sidewalls 28, and extending downwardly from the central opening in the sifter 28 is the tubualr portion 32, all as previously described. Positioned below the sifter 26 is a divider generally indicated be the numeral 146. The divider, as shown in FIGS. 10, 15, 16, and 17, is elongated, and in cross-section taken perpendicular to the longitudinal axis of inverted V-shaped configuration. Positioned below divider 146 is a first breading recptacle 148 and a second breading receptacle 150. Breading sifted from sifter 26 falls downwardly, and is diverted by divider 146 into the first and second breading pans 148 and 150. As shown in FIG. 7, the pans preferably have rims so that the pans can be supported by the rims or supported on the bottoms as preferred.

Figure 18:
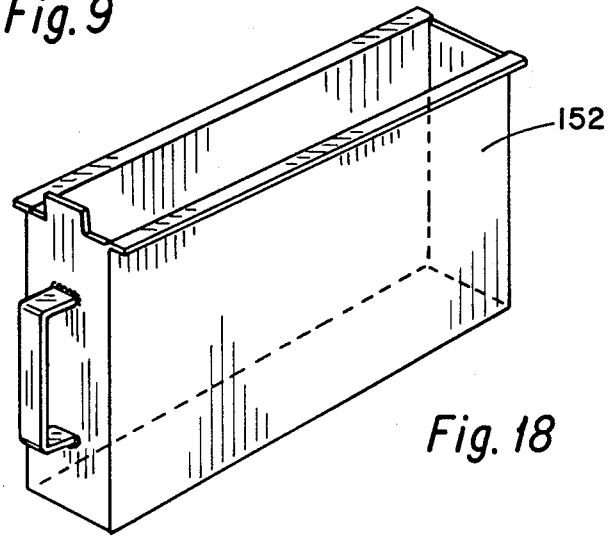
FIG. 18 is an isometric view of one form of a dough ball collector pan as employed in the invention.
Figure 10:
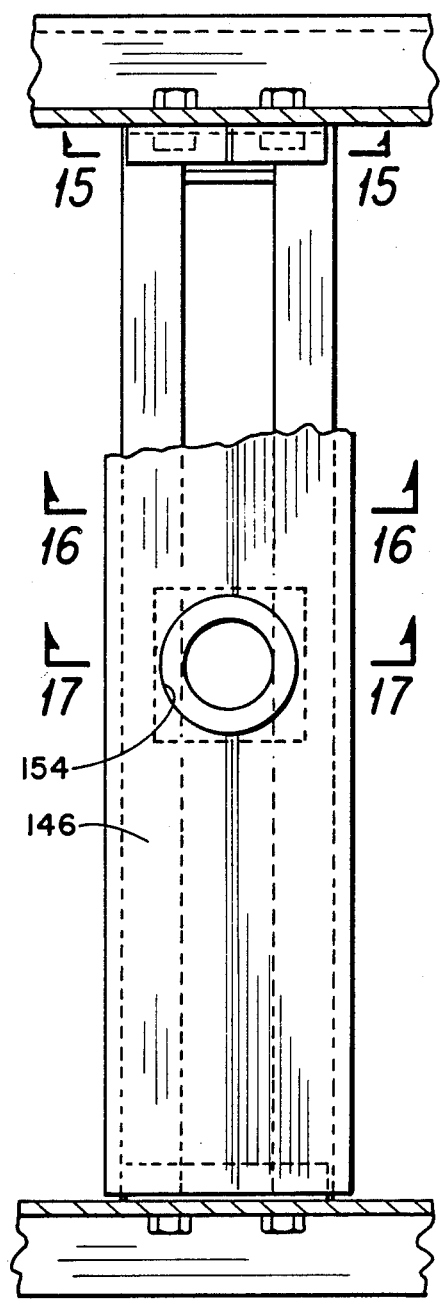
FIG. 10 is a horizontal cross-sectional view of the divider and the dough ball conduit as taken along the line 10—10 of FIG. 7.
Figure 15:
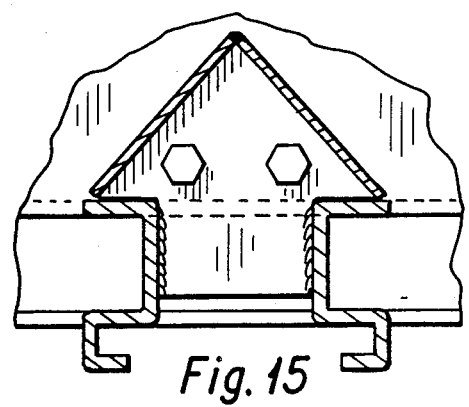
FIG. 15 is a fragmentary elevational view of the breader divider mechanism as taken along the line 15—15 of FIG. 10.
Figure 16:
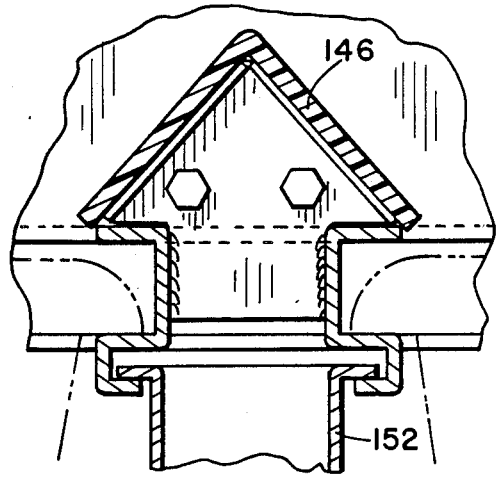
FIG. 16 is another cross-sectional view of the breader divider as taken along the line 16—16 of FIG. 10.

Positioned between the first and second breading pans is a dough ball collector pan 152. As shown in FIG. 18, the dough ball collector pan is preferably long and narrow so as to fit between the first and second breader pans 148 and 150.

Figure 17:
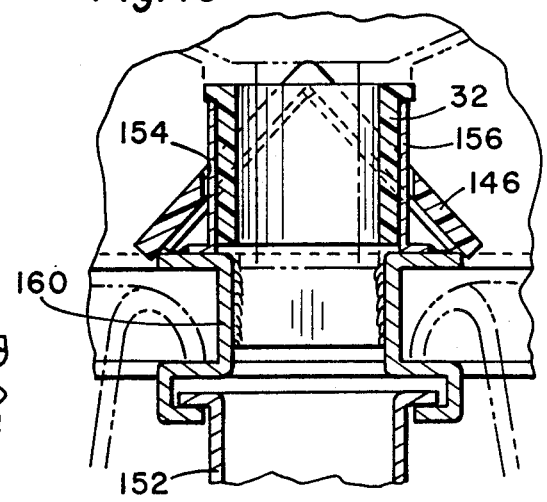
FIG. 17 is a third cross-sectional elevational view of the divider and showing the dough ball conduit as taken along the line 17—17 of FIG. 10.

As illusrated in FIGS. 7, 9, 10, and 17, the deflector 146 has an opening 154 which receives a dough ball conduit 156 extending upwardly therethrough. The dough ball conduit 156 is removably supported relative to the frame-work of the table 10. The dough ball collector pan 152 is slideably positioned below the dough ball conduit 156. As shown in FIG. 17, the dough ball conduit 156 communicates with a second conduit 160 formed as a part of the table structure. Thereby, dough balls which are discharged from the sifter tubular poriton 32 pass downwardly through the dough ball conduit 156 and second conduit 160 into the dough ball collector pan 152.

In this manner, the dough balls are collected in pan 152, and the reusable breading is collected in pans 148 and 150. The dough ball pan is easily removed from the table to be emptied of collected dough balls, and the breading collector pans 148 and 150 are likewise easily removed, and in typical use the recovered breading is discharged back into the first breading container 16 for reuse.

The improved embodiment of FIGS. 7–18 has advantages over the first embodiment described herein in that it is not necessary for the dough ball collector pan to rest inside the breader collector pan. Further, by dividing the sifted breading into two different pans, the pans are smaller and easier to handle and permits the dumping of reusable breading back into the first breading container 16 with less effort and with less spillage.

The claims and the specification describe the invention presented and the terms that are employed in the clams draw their meaning from the use of such terms in the specification. The same terms employed in the prior art may be broader in meaning than secifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purpose of exemplification, but is to be limited only by the scope of the attached claim or claims, including the full range of equivalency to which each element thereof is entitled.

What is claimed is:

1. Improved apparatus for separating dough balls from reusable breading comprising:
   a breading container for holding breading having dough balls commingled therewith, the breading container having an aperture in the bottom thereof for selectably discharging breading and commingled dough balls;
   a sifter having foraminous portions positioned below said breading container bottom aperture, the sifter having a bottom with a central opening therein;
   means to actuate said sifter to cause breading to be sifted through said foraminous portions;
   means within said sifter to cause dough balls to be separately discharged through said central opening;
   a divider means below said sifter separating into divergent downwardly inclined paths the breading sifted from said sifter, the divider having an opening therethrough;
   a conduit means received in said divider opening having an upper and a lower end, the upper end being in close commnication with said sifter central opening;
   first and second spaced apart breading collector means below said sifter and said divider to receive breading discharged from said sifter; and
   a dough ball collector means below said conduit means for receiving dough balls discharged from said sifter.

2. Improved apparatus for separating dough balls from resuable breading according to claim 1 wherein said divider means is elongated, and in cross-section perpendicular to the longitudinal axis has a top surface of inverted V-shaped configuration.

3. Improved apparatus for separating dough balls from reusable breading according to claim 1 wherein said breading collector means are separated pans.

4. Improved apparatus for separating dough balls from reusable breading according to claim 3 wherein each of said pans are individually slideably supported relative to said sifter and may be individually removed for dumping sifted breading into said breading container.

5. Improved apparatus for separating dough balls from reusable breading according to claim 1 wherein said dough ball collector is in the form of a pan supported between said first and second breading collector means.

6. Improved apparatus for separating dough balls from reusable breading according to claim 3 wherein said dough balls collector is in the form of an elongated pan supported between said first and second breading collector pans.

* * * * *